(No Model.)

J. DAVIS.
NUT LOCK.

No. 419,322. Patented Jan. 14, 1890.

Witnesses:
Fred R. Cornwall
A. M. Robinson

John Davis
Inventor
By Benj. F. Butler
Chas. E. Barber
Attys.

UNITED STATES PATENT OFFICE.

JOHN DAVIS, OF NEW BEDFORD, MASSACHUSETTS.

NUT-LOCK.

SPECIFICATION forming part of Letters Patent No. 419,322, dated January 14, 1890.

Application filed January 12, 1885. Serial No. 152,567. (No model.)

*To all whom it may concern:*

Be it known that I, JOHN DAVIS, a citizen of the United States, residing at New Bedford, in the county of Bristol and State of Massachusetts, have invented an improved spring-ring nut-lock for locking the nuts on the bolts of fish-jointed railway-bars and on the bolts of other devices, of which the following is a specification.

My invention consists in an open steel spring-ring spirally twisted and spring-tempered, with its ends cut diagonally, like planing-chisels, making the outer edge or point of the washer so sharp and strong that it will cut into the nut and fish-plate, thus causing it to act against the fish-plate and nut and thereby prevent the nut from backing off.

Figure 1:
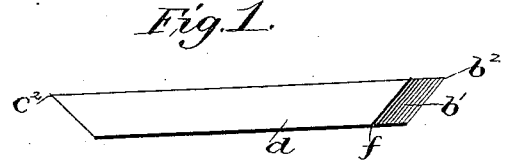
Figure 2:
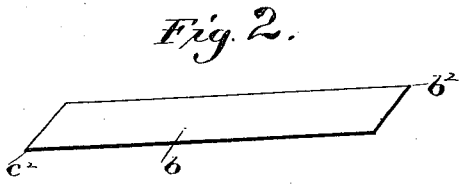
Figure 3:
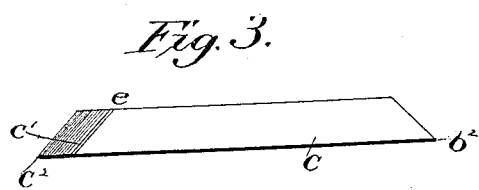
Figure 4:
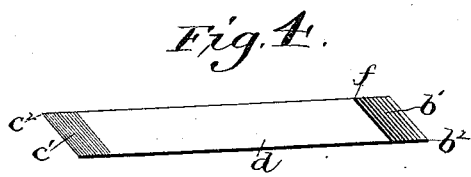
Figure 5:
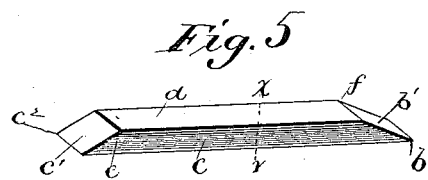
Figure 7:
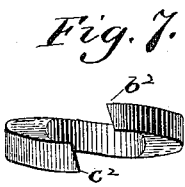
Figure 8:
Figure 6:
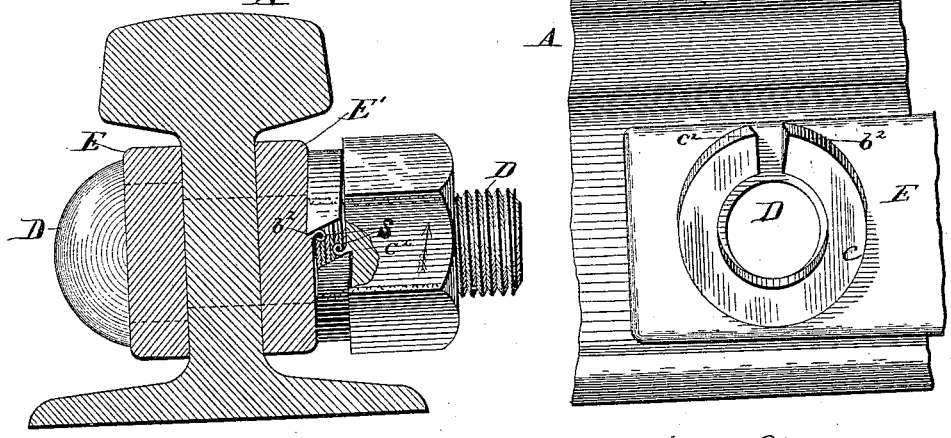
Figure 9:
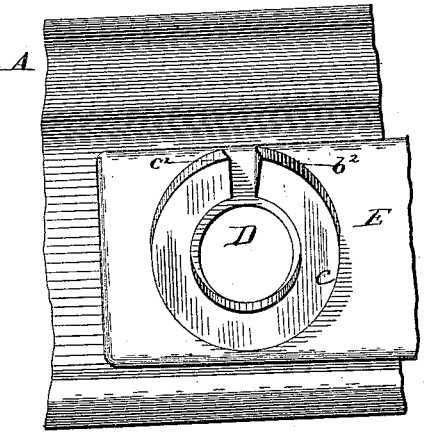

Figures 1, 2, 3, and 4 are views of the four different sides of the bar from which the nut is made. Fig. 5 is a perspective, showing the two beveled ends. Fig. 6 shows the chisel-edged washer cutting into a nut and fish-plate as the nut is being unscrewed. Fig. 7 is a perspective of the chisel-edged washer as it is bent into a circular ring ready for use as a nut-lock. Fig. 8 is a cross-section of Fig. 5 on the line $xx$, showing the shape of the bar from which the washer is made. Fig. 9 is a side view of my nut-lock in position on the bolt, and showing also a portion of fish-plate and rail.

This ring is formed from a bar of spring-steel, tempered, one-fourth of an inch square and four inches long. It may be made of any desired heft or rigidity. It is turned into a ring and spirally twisted, as shown. The inside diameter of this open spirally-twisted spring-ring is one-sixteenth of an inch larger than the diameter of the fish-bolt. The ends of this open spirally-twisted spring-ring are beveled on the back and front sides, as shown, (see Fig. 1,) forming chisel ends. This spirally-twisted ring is placed on the bolt, as also shown, (see Fig. 6,) so that in turning on the nut it may freely revolve with it and slide around on the side of the fish-plate, or the inner face of the nut may slide around on the outer face of the ring till the ring is straightened and its elasticity compressed and held between the nut and fish-plate, when the nut will be turned home. In turning off the nut the chisel end $b^2$ of the ring will cut into the fish-plate and the chisel end $c^2$ will also cut into the inner face of the nut, and by applying sufficient power on the wrench the chisel ends $b^2$ and $c^2$ of the ring will plane off a thin portion of the fish-plate or nut, or both, till the ring has assumed its twisted form. (See Fig. 6.) Thus this ring may be repeatedly used with no loss of elasticity, and the chip cut from the fish-plate or nut, or both, will be so thin that no perceptible diminution of strength of fish-plate or nut will be observed. (See curled chips at $s$ in Fig. 6.)

Fig. 6 shows the well-known fish-bolt and nut, and $b^2$ and $c^2$ the chisel ends of the ring nut-lock. The cutting-edges of my ring nut-lock are in true helical plane of the ring.

I am aware that heretofore an annular spring-washer has been made, the transverse edges of which, next the cut or section, project beyond the true helical plane, and I do not claim such construction.

I am aware that spring-washers having ends with biting-points bent without the plane of the ring have been used for locking-nuts, but such devices will not lie close and firm between the nut and the fish-plate, but prevent the nut from being turned home, and such rings are destroyed by removing the nuts; that there are also spring-washers which have bulbs on the ends of the rings, which bulbs fall into depressions in the nut and fish-plate to prevent them from jarring off; that there are others with beveled ends to produce friction against the nut and fish-plate; that none of these devices have chisel ends set in plane of the ring to hold the nuts from turning off, and which will chip off the face of the nut, and that I make no claim to any of the devices above stated; but What I do claim as my invention, and desire to secure by Letters Patent, is—

1. A spring nut-lock consisting of a left-handed helix making a portion of a turn and having its end surfaces slanting away from the acting edges at an acute angle to the outer surface and to each helical surface, substantially as described.

2. A nut-lock consisting of a helix, having oppositely-extending ends tapered both longitudinally and transversely, forming a nut-lock with acute-angled cutting-points and inclined cutting-edges at the upper and outer ends of the helix, as described and shown.

3. A nut-lock consisting of a severed helix-shaped washer, having its ends wide apart and provided with inclined edges, beveled in two directions, forming an acute-angled cutting-edge, substantially as and for the purpose specified.

JNO. DAVIS.

Witnesses:
SOUTHWARD POTTER, 2d,
EPHRAIM CHANEY.